United States Patent [19]

Lang et al.

[11] Patent Number: 5,066,180
[45] Date of Patent: Nov. 19, 1991

[54] EASY ACCESS NUTPLATE

[76] Inventors: Charles F. Lang, 88 Lynn Dr., Monroe, Conn. 06468; Henry E. Konopka, 8 Laura La., Oxford, Conn. 06483

[21] Appl. No.: 624,372

[22] Filed: Dec. 7, 1990

[51] Int. Cl.$^5$ .................... F16B 37/04; F16B 37/08; F16B 39/00
[52] U.S. Cl. ................... 411/103; 411/105; 411/113; 411/178; 411/432
[58] Field of Search .............. 411/84, 85, 103, 105, 411/108, 109, 111–113, 173, 177, 178, 183, 432, 433, 427

[56] References Cited

U.S. PATENT DOCUMENTS

| | | | |
|---|---|---|---|
| 2,304,107 | 12/1942 | Leisure | 411/111 |
| 2,374,548 | 4/1945 | Leisure | 411/85 |
| 2,413,669 | 12/1946 | Whitcombe | 411/85 |
| 2,633,175 | 3/1953 | Desbrueres | 411/85 |
| 2,822,014 | 2/1958 | Cummaro | 411/109 |

FOREIGN PATENT DOCUMENTS 565669  8/1957  Italy ..................... 411/103

Primary Examiner—Neill R. Wilson

[57] ABSTRACT

A nutplate assembly (10), for attaching to a structure (11), is comprised of a nut element (14), an insert (16), a snap ring (18), and a cover plate (20). Installation of the assembly (10) does not deform the attaching structure (11) and the insert (16) can be replaced by accessing only one side of the structure (11).

3 Claims, 1 Drawing Sheet

EASY ACCESS NUTPLATE

This invention was made with Government support under a contract awarded by the Department of the Navy. The Government has certain rights in this invention.

DESCRIPTION

1. Technical Field

This invention relates to the field of threaded fasteners and more particularly to the field of nutplate threaded fasteners.

2. Background Art

A nutplate provides a threaded engagement, usually with an internally threaded insert, for attaching a bolt or a screw to an attaching structure where access to a conventional nut would be difficult. When the internal threads of the insert become damaged, the insert needs to be replaced. However, since the purpose of the nutplate is to provide a threaded attachment at areas which are otherwise difficult to access, removing and replacing the insert may be awkward.

U.S. Pat. No. 3,130,765 to Neuschotz titled "Self-Aligning Threaded Insert with Resilient Retaining Rings" discloses a nutplate having a replaceable, internally threaded insert. Affixing the insert requires two opposing key wedges which are pressed into the structure at points adjacent to the outside portion of the insert. However, structural deformation caused by the key wedges limits the number of times that the insert can be replaced.

DISCLOSURE OF INVENTION

Objects of the invention include a nutplate having an easily replaceable insert.

According to the present invention, a nutplate assembly includes a nut element, a cover plate, an insert, and a retainer arranged such that the insert can be installed and replaced from one side of an attaching structure.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
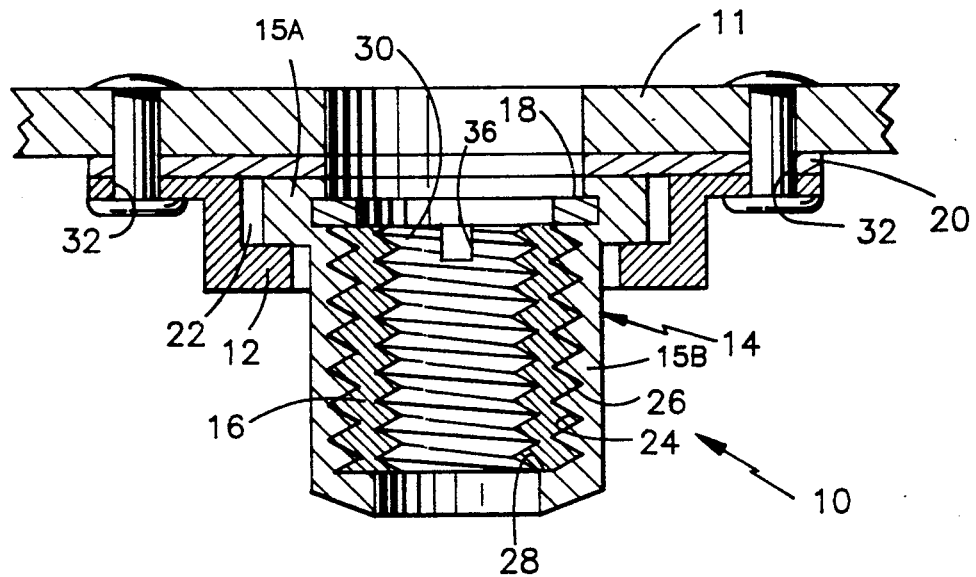
FIG. 1 is a sectioned side view of a nutplate assembly.
Figure 2:
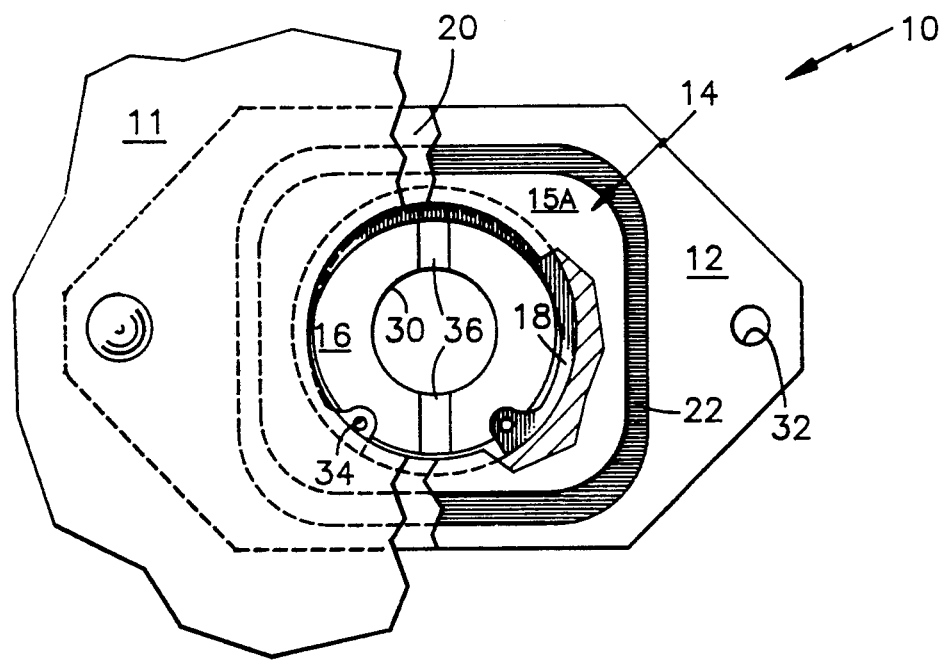
FIG. 2 is a top view, partially broken away, of a nutplate assembly.

Referring to FIG. 1 and FIG. 2, a nutplate assembly 10, for providing a fixed attachment to an attaching structure 11 such as a sheet metal helicopter structure, is comprised of a retaining base 12, a nut element 14, a threaded insert 16, a snap ring 18, and a cover plate 20. The nut element 14 is comprised of a head 15A and a shank 15B. The head 15A is wider than the shank 15B and rests against the retaining base 12 while the shank 15B is inserted into an opening provided therethrough. The head 15A prevents the nut element 14 from passing through the opening. A pair of holes 32 in the retaining base 12 and the cover plate 20 are provided for attaching the assembly 10 to the attaching structure 11 with rivets.

The retaining base 12 has a cavity therein which is somewhat larger than the head 15A of the nut element 14 to provide for a radial gap 22 between the retaining base 12 and the head 15A. The nut element 14 can be moved laterally a limited amount within the gap 22, thus providing a self-centering capability to compensate for slight imperfections in alignment of multiple bolts or screws associated with whatever is being attached to the structure 11 at the nutplate assembly 10.

The nut element 14 has internal threads 24 for mating with external threads 26 of the insert 16. The bottom portion of the nut element 14 is L-shaped to define a lip 28 to prevent the insert 16 from threading past the end of the nut element 14. The insert 16 has internal threads 30 for accepting a bolt or a screw. The number of threads per inch of the internal threads 30 is not necessarily the same as the number of threads per inch of the external threads 26.

The nutplate assembly 10 is assembled by first threading the insert 16 into the nut element 14 until contact is made with the lip 28. The insert 16 has a slot 36 for accepting a screwdriver. Then the snap ring 18 is installed by using needle nose pliers or the equivalent to compress the ring 18 at looped ends 34 of the ring 18. The snap ring 18 prevents the insert 16 from turning out of the nut element 14 when a bolt or screw is turned out of the insert 16. After the snap ring 18 is installed, the nut element 14 is inserted into the retaining base 12. The cover plate 20 is then placed over and attached to the retaining base 12 by one of a variety of means known to those skilled in the art such as brazing, welding, or crimping. The cover plate 20 holds the nut element 14 in the retaining base 12. The completed nutplate assembly 10 is a self-contained unit which can be attached to the attaching structure 11 by the rivets through the holes 32. Rotation of the nut element 14 is limited because the head 15A of the nut element 14 and the retaining base 12 are rectangularly shaped.

After installation, the internal threads 30 of the insert 16 can accept a bolt or a screw. The gap 22 provides a self-centering capability to the assembly 10. If the internal threads 30 of the insert 16 ever become damaged, the insert 16 can be replaced by removing the snap ring 18, using a screwdriver in the slot 36 to thread the insert 16 out of the nut element 14, replacing the insert 16, and reinstalling the snap ring 18. No access to the other side of the attaching structure 11 is required.

Although the invention is illustrated herein with a flat cover plate 20 and a retaining base 12 having a cavity therein, the invention may be practiced by mounting a nut element to a flat retaining base and providing a cavity or dome within the cover plate. Similarly, the cover plate 20 can be eliminated and the pieces of nutplate assembly 10 can be loosely placed behind the attaching structure 11 before the retaining base 12 is riveted to the attaching structure 11. The shape of the cavity within the retaining base 12 and of the head 15A of the nut element 14 may be modified so long as the shapes cooperate to limit rotation of the nut element 14. The nut element 14 may be of a different shape than illustrated herein and may not even include a head 15A and a shank 15B, so long as some means is provided for limiting rotation of the nut element 14 and of keeping the nut element 14 from passing into the attaching structure 11. The cover plate 20 and/or the retaining base 12 may be attached to the structure 11 using other means known to those skilled in the art, such as welding or brazing.

Even though the invention has been illustrated using a snap ring 18 and a lip 28 to prevent rotation of the insert 16 after installation, other means obvious to one skilled in the art, including the use of a keyway, exist for preventing rotation of the insert 16. The internal threads 24 of the nut element 14 and the external threads 26 of the insert 16 may be eliminated if a keyway or other means are used to prevent rotation of the insert 16. The slot 36 in the insert 16 may be eliminated and replaced by other means known to those skilled in the art for rotating the insert 16. The gap 22 between the nut element 14 and the retaining base 12, which provides the self-centering capability illustrated herein, can be any size (including zero) required by the particular application of the invention.

Although the invention has been shown and described with respect to exemplary embodiments thereof, it should be understood by those skilled in the art that various changes, omissions and additions may be made therein and thereto, without departing from the spirit and the scope of the invention.

We claim:

1. A nutplate assembly, comprising:

a nut element, comprising a shank having external threads and a coaxially attached, rectangularly shaped head having a larger diameter than said shank;

a retaining base, adapted to accept a portion of said nut element and to limit rotation of said nut element;

an insert, adapted to be positioned within said nut element, having an internally threaded portion and having an externally threaded portion for mating with threads of said shank; and a lip on said nut element for attaching a snap ring to retain said insert axially within said nut element.

2. A nutplate assembly, according to claim 1, further comprising:

a cover plate, for holding said nut element within said retaining base, attached to said retaining base and having an opening therethrough for accessing said insert.

3. A nutplate assembly, according to claim 2, wherein said cover plate and said retaining base are adapted for mounting to an attaching structure by riveting.

* * * * *